US010644271B1

(12) United States Patent
Amatucci et al.

(10) Patent No.: US 10,644,271 B1
(45) Date of Patent: May 5, 2020

(54) PACKAGING MATERIAL FOR ELECTROCHEMICAL CELLS

(71) Applicant: Rutgers, The State University of New Jersey, New Brunswick, NJ (US)

(72) Inventors: Glenn G. Amatucci, Peapack, NJ (US); Anna B. Halajko, Parlin, NJ (US); Linda Wu Sung, Morris Plains, NJ (US); Anthony Ferrer, North Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 123 days.

(21) Appl. No.: 16/017,927

(22) Filed: Jun. 25, 2018

Related U.S. Application Data

(63) Continuation of application No. 14/150,321, filed on Jan. 8, 2014, now abandoned.

(60) Provisional application No. 61/750,238, filed on Jan. 8, 2013.

(51) Int. Cl.
    *H01M 2/02* (2006.01)
(52) U.S. Cl.
    CPC ................................ *H01M 2/0287* (2013.01)
(58) Field of Classification Search
    CPC ............ H01M 2/0287; H01M 2/0292; H01M 2/0275; H01M 2/0277; H01M 2/0285; C09D 165/04
    See application file for complete search history.

(56) References Cited

U.S. PATENT DOCUMENTS

| 4,163,828 | A | * | 8/1979 | Mahoney | C08G 61/025 428/523 |
| 4,950,365 | A | * | 8/1990 | Evans | C09D 165/04 204/164 |
| 4,961,994 | A | * | 10/1990 | Cariou | B64G 1/54 428/408 |
| 2005/0227055 | A1 | * | 10/2005 | Senkevich | B05D 1/60 428/214 |
| 2009/0263581 | A1 | * | 10/2009 | Martin, III | C23C 14/0647 427/255.395 |
| 2012/0135292 | A1 | * | 5/2012 | Buckingham | H01M 2/0277 429/153 |
| 2013/0093398 | A1 | | 4/2013 | Takabayashi et al. | |
| 2013/0143104 | A1 | * | 6/2013 | Schein | H01M 2/0222 429/162 |
| 2013/0209868 | A1 | | 8/2013 | Suzata et al. | |
| 2013/0236773 | A1 | * | 9/2013 | Nagata | H01M 2/0277 429/176 |

(Continued)

OTHER PUBLICATIONS

Jansen et al., "Low-Cost, Flexible Battery Packaging Materials", JOM, 2002, pp. 29-32 & 54.

*Primary Examiner* — Stephen J Yanchuk
(74) *Attorney, Agent, or Firm* — Greenberg Traurig, LLP

(57) ABSTRACT

The described invention relates to the use of parylene and composites of parylene as a flexible, sealable, and near hermetic barrier packaging material for nonaqueous electrochemical cells. Additionally, the invention relates to the technique of sealing of battery packaging material through the use of ultrasonic energy, and to the use of a low melting temperature inorganic barrier, which is predisposed between higher melting temperature polymer layers, that can be sealed to form a truly hermetic barrier at the interface.

12 Claims, 12 Drawing Sheets

(56) References Cited

U.S. PATENT DOCUMENTS

2014/0255765 A1    9/2014   Akita et al.
2014/0335403 A1   11/2014   Akita et al.

* cited by examiner

PACKAGING MATERIAL FOR ELECTROCHEMICAL CELLS

CROSS-REFERENCE TO RELATED APPLICATIONS

This application is a continuation of U.S. patent application Ser. No. 14/150,321 filed Jan. 8, 2014, which claims the priority of U.S. Provisional Patent Application No. 61/750,238, filed on Jan. 8, 2013, which is incorporated herein by reference in its entirety.

STATEMENT OF GOVERNMENT FUNDING

This invention was made with U.S. government support. The government has certain rights in the invention.

FIELD OF THE INVENTION

This invention relates to the invention of improved barrier packaging for non aqueous electrochemical cells, specifically batteries.

BACKGROUND OF THE INVENTION

Many battery systems, such as the ubiquitous Li-ion battery, are extremely sensitive to water. These cells are enabled through the use of nonaqueous technologies which expand the operating potential windows of the cells significantly. Any water infiltration, even on the order of a few tens of ppm, has disastrous effects on the reliability and electrochemical performance of the cell within. In order to maintain the required purity, much attention is given to the packaging material which protects the electrochemical cell. Key to such cells is the application of a barrier between the cell and the ambient environment to prevent exposure of the cell to oxygen and moisture which would degrade performance of such cells drastically. Hermetic or near hermetic conditions are required. In order to supply such conditions, one typical state of the art packaging consists of a metal can, which is crimped closed with a polymer gasket or laser welded with glass metal seals to allow the current collectors through without shorting the cell. These cans have limited shape flexibility, considerable weight, and volume. Alternative packaging in the form of flexible multi laminate packaging consists of layers of distinct function. In short these packages consist of an inner layer of metal, typically Al of 20-60 microns, an outer layer of a tough mechanical barrier polymer such as a polyester, and an inner heat sealable layer consisting of an acid modified polyolefin (See, Jansen et al., *Low-Cost, Flexible Battery Packaging Materials*, JOM, 2002 March, pp. 29-32 and 54).

It is important that such barrier protection is not only effective at the face of the barrier but also at perimeters where the barrier is sealed to itself or to protruding tabs. Relative to the seals, the current materials found on today's state of the art batteries include acid modified polyolefins such as poly ethylene and poly propylene. A severe problem exists as these materials, although somewhat effective as a barrier to the permeation of moisture and oxygen, are very poor barriers to the permeation of linear carbonates commonly utilized in lithium batteries today, including, but not limited to, dimethyl carbonate (DMC), diethyl carbonate (DEC), and ethyl methyl carbonate (EMC). Once these materials are swollen with these solvents, the barrier protection these materials offer to the battery cell degrades drastically. It would be desirable to have a material that has outstanding intrinsic barrier properties to the transport of solvents while affording the ability to seal the material to itself and also protruding metallic tabs. This will allow a significant decrease in the seal width and therefore allow improvement in volumetric efficiency of the battery.

Parylene is a material with known hydrophobicity and excellent barrier properties to the permeation of a number of chemical compounds. To our knowledge, Parylene has never been disclosed as a good barrier for non-aqueous batteries containing solvents with the ability to have self standing sheets, the ability and technique to seal to itself and to components of the battery such as tabs, and the use of multilayer composites to afford additional barrier properties.

SUMMARY OF INVENTION

The described invention relates to the use of parylene and composites of parylene as a flexible, sealable, and near hermetic barrier packaging material for nonaqueous electrochemical cells. Additionally, the described invention relates to the technique of sealing of battery packaging material through the use of ultrasonic energy. Additionally, the described invention relates to the use of a low melting temperature inorganic barrier, which is predisposed between higher melting temperature polymer layers, that can be sealed to form a truly hermetic barrier at the interface.

According to one aspect, the described invention provides a composite barrier packaging material for an electrochemical cell comprising a layer of parylene and an inorganic layer that can be bonded to the parylene layer.

According to one embodiment, the parylene layer and inorganic layer of the packaging material are bonded to each other by bonding the parylene layer of one piece of packaging material to the parylene layer of a second piece of packaging material. According to another embodiment, the parylene of one piece of packaging material is bonded to the parylene layer of a second piece of packaging material by application of heat. According to another embodiment, the parylene of one piece of packaging material is bonded to the parylene layer of a second piece of packaging material by application of ultrasonic energy. According to another embodiment, the parylene of one piece of packaging material is bonded to the parylene layer of a second piece of packaging material by application of a laser. According to another embodiment, the laser is an infrared laser. According to another embodiment, the inorganic layer is a metal. According to another embodiment, the metal is aluminum, copper, bismuth, lead, tin, gallium, indium, or a combination thereof. According to another embodiment, the parylene is parylene C, parylene N, parylene F, parylene D, or a combination thereof. According to another embodiment, the composite barrier packaging material further comprises a polymer. According to another embodiment, the polymer is a polyester, a polypropylene, a polyethylene, polyvinylidene fluoride, or polydimethylsiloxane (PDMS).

According to another aspect, the described invention provides a composite barrier packaging material for an electrochemical cell comprising a polymer layer and a metal layer, wherein melting temperature of a metal in the metal layer is less than melting temperature of a polymer in the polymer layer.

According to one embodiment, the polymer is parylene. According to another embodiment, the polymer is polypropylene. According to another embodiment, the polymer is polyvinylidene fluoride. According to another embodiment, the polymer is polydimethylsiloxane (PDMS). According to another embodiment, the metal comprises bismuth. According to another embodiment, the metal comprises tin, lead, gallium, indium, silver, aluminum or a combination thereof. According to another embodiment, structure of the material is multilayered with a repeating pattern of polymer and metal. According to another embodiment, the metal layer of one piece of the material is bonded to the metal layer of a second piece of the material to form a hermetic seal. According to another embodiment where the metal layer of one piece of the material is bonded to the metal layer of a second piece of the material to form a hermetic seal, the polymer is parylene. According to another embodiment where the metal layer of one piece of the material is bonded to the metal layer of a second piece of the material to form a hermetic seal, the polymer is polypropylene. According to another embodiment where the metal layer of one piece of the material is bonded to the metal layer of a second piece of the material to form a hermetic seal, the polymer is polyvinylidene fluoride. According to another embodiment where the metal layer of one piece of the material is bonded to the metal layer of a second piece of the material to form a hermetic seal, the polymer is polydimethylsiloxane (PDMS). According to another embodiment where the metal layer of one piece of the material is bonded to the metal layer of a second piece of the material to form a hermetic seal, the metal comprises bismuth. According to another embodiment where the metal layer of one piece of the material is bonded to the metal layer of a second piece of the material to form a hermetic seal, the metal comprises tin, lead, gallium, aluminum, or a combination thereof. According to another embodiment where the metal layer of one piece of the material is bonded to the metal layer of a second piece of the material to form a hermetic seal, the material has a multi-layer structure comprising a repeating pattern of polymer and metal. According to another embodiment where the metal layer of one piece of the material is bonded to the metal layer of a second piece of the material to form a hermetic seal, the bonding of the metal layer of the first piece of material to the metal layer of the second piece of material is accomplished through application of thermal energy. According to another embodiment where the metal layer of one piece of the material is bonded to the metal layer of a second piece of the material to form a hermetic seal, the bonding of the metal layer of the first piece of material to the metal layer of the second piece of material is accomplished through application of ultrasonic energy. According to another embodiment where the metal layer of one piece of the material is bonded to the metal layer of a second piece of the material to form a hermetic seal, the bonding of the metal layer of the first piece of material to the metal layer of the second piece of material is accomplished through application of laser energy.

According to another aspect, the described invention provides a barrier packaging material comprising substantially pure parylene.

According to one embodiment, the barrier packaging material comprises at least two pieces of parylene bonded to form a package. According to another embodiment, the package is formed by the application of thermal energy. According to another embodiment, the thermal energy is applied by ultrasonic sealing. According to another embodiment, the thermal energy is applied by a laser. According to another embodiment, the substantially pure parylene is free standing.

DETAILED DESCRIPTION

Definitions

Figure 1:
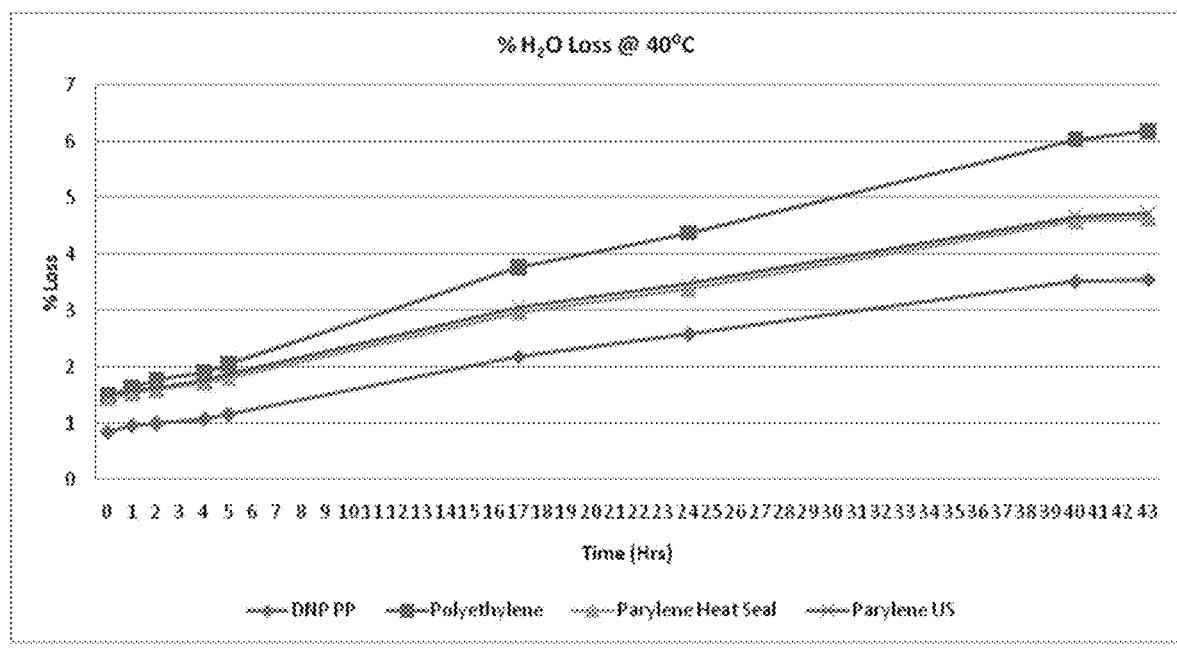
FIG. 1 shows the percent (%) loss of $H_2O$ at 40° C. as a function of time for polypropylene (DNP PP), polyethylene, parylene heat seal and parylene ultrasonic seal (U.S.).
Figure 2:
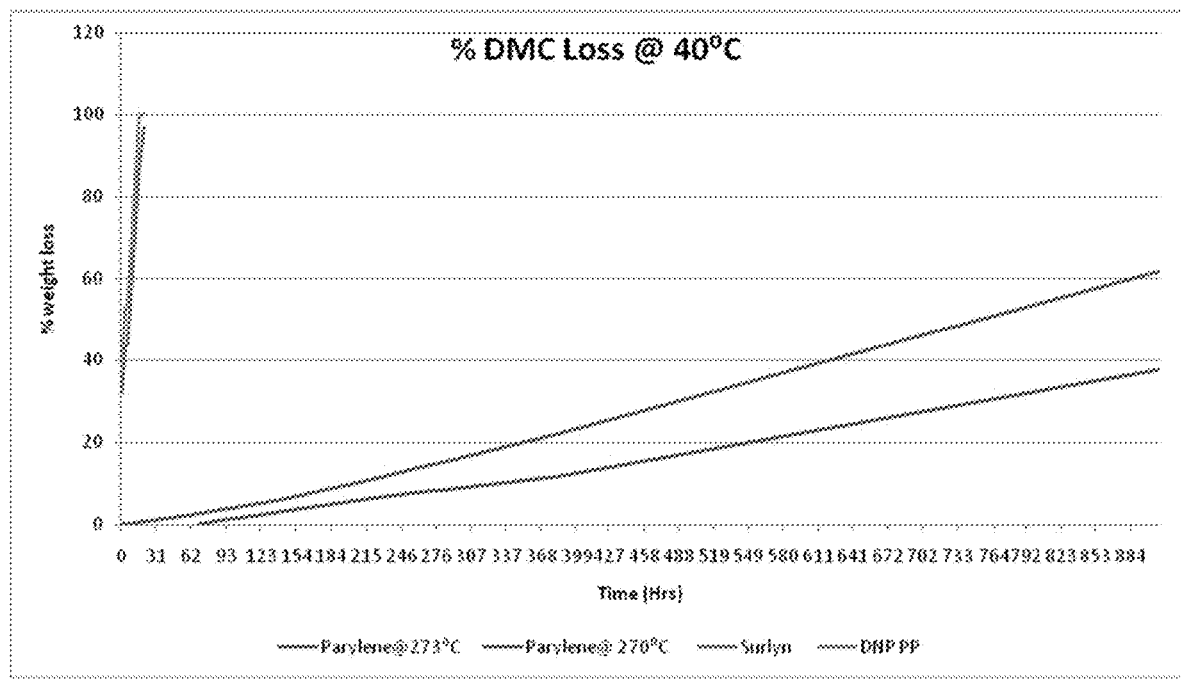
FIG. 2 shows the percent (%) loss of DMC at 40° C. as a function of time for Parylene at 273° C.; Parylene at 270° C., acid-modified polyethylene (Surlyn®) and polypropylene (DNP PP).

The term "bond" and its various iterations as used herein refers to the adhesion between two substances; to connect or to bind.

The term "free standing" as used herein refers to standing alone; not part of or affiliated with another. For example, the parylene of the described invention can be free standing parylene; that is, parylene which is not directly deposited parylene.

The term "parylene" as used herein is the tradename for a variety of chemical vapor deposited poly(p-xylylene) polymers. Parylene dimer is produced in several variations. Non-limiting examples include parylene C, parylene D, parylene F and parylene N.

The term "substantially pure" as used herein means free from anything of a different, inferior or contaminating kind; free from extraneous matter. According to some embodiments, substantially pure parylene is at least 90% pure, at least 91% pure, at least 92% pure, at least 93% pure, at least 94% pure, at least 95% pure, at least 96% pure, at least 97% pure, at least 98% pure, at least 99% pure, or at least 100% pure.

Parylene is the tradename for a variety of chemical vapor deposited poly(p-xylylene) polymers. Although the use of parylene seems very attractive, part of the reason it has never been applied to nonaqueous battery technology is that the melting temperature of such materials is very high. As described in detail above, the formation of seals to bond two parts of the packaging together is paramount to effectively encapsulate an active battery. To utilize the advantageous properties of the packaging, it is required that the parylene used to create the packaging seals with itself. However, the high temperatures required to bond parylene together approach 300° C. and would result in exceptional damage to the electrochemical cell, especially when the seal is in close proximity to the cell itself, as would be needed in volumetrically sensitive applications.

According to one aspect, the use of parylene as a component of a battery packaging and seal material has been developed using, a new approach of ultrasonic energy sealing to attach parylene layers together. The use of ultrasonic energy allows the bonding of similar polymer layers without a significant rise of non-local temperature. To our knowledge, no publication of the use of ultrasonic energy to bond parylene or the use of such technique for sealing other packaging for battery applications exists.

Acid modified polypropylene ("PP") or acid modified polyethylene ("PE") is a common packaging layer that is utilized as the seal. The barrier properties of parylene to water and oxygen transport are well known to be superior to the aforementioned thermoplastics. However, a major challenge in Li-ion batteries is the ability of the ubiquitous linear carbonates (including, without limitation, dimethyl carbonate, diethyl carbonate, ethyl methyl carbonate, etc.) to swell the polypropylene and polyethylene seal and have fast transport through such seals. Although this leads to a change in the electrolyte composition, it is of most concern that the swelling results in much increased moisture transport rates into the cell. There is no known data showing whether linear carbonate permeation would be better or worse than that of the common polyolefin used as sealing layers in lithium ion batteries today.

To test the ability of parylene to acts as an effective barrier to linear carbonate permeation, small packages made of pure parylene as per the details of example 1 were fabricated, filled with dimethyl carbonate ("DMC"), and sealed. Similar packaging was made with today's ubiquitous sealing layer materials: one package was made of poly propylene and another was made of pure polyethylene. These packages were then placed at 40° C. and the loss of DMC was recorded as a function of time.

It can be seen from the figures associated with example 1 that although water barrier properties are somewhat similar, parylene greatly improved the resistance of linear carbonate permeation and would be an ideal sealing layer.

Because no polymer is truly hermetic, although seals using parylene are much improved over polyolefin's, it is required that the face of the packaging contain a truly hermetic inorganic layer. Such layers can be of metals, including, without limitation aluminum, copper, bismuth, lead, tin, gallium, indium, or a combination thereof Example 2 describes the fabrication of a packaging/barrier material consisting of a thin layer of copper deposited by thermal evaporation on the surface of Parylene. To improve adhesion, silane treatments can be utilized. A thin layer of parylene was deposited on top of the copper layer as an outside barrier. Two parts of the parylene copper-parylene composite package were bonded together by heat-sealing the parylene layers with a thermal sealer. Afterwards, DMC was filled within the package, the package top sealed, and the loss of DMC at 40° C. was noted as a function of time. The supporting data of example 2 show that a significant improvement in DMC evolation was found relative to the pure parylene packages.

Throughout the battery industry, thermal sealing is used for the bonding of packaging layers. Recent advances in packaging technology has lead to a higher melting temperature polypropylene sealing layer. This, combined with the fact that the current invention utilizes parylene, which bonds at temperatures almost 100° C. higher than polypropylene, creates particular problems when one wants to seal a battery very close to the cell perimeter without damaging the cell.

According to another aspect, the present invention further provides a method of sealing a battery package through the use of ultrasonic energy. This method allows the fabrication of seals very close to the perimeter of the battery without inducing thermal damage of the battery.

To demonstrate the effectiveness of the technique before applying it to the present invention based on parylene, commonly utilized multilayer nylon-aluminum-polypropylene packaging (Dai Nippon Plastics, D-EL-40) that has a polypropylene sealing layer was bonded and tested against solvent loss. As can be seen in example 3, an exceptional seal is enabled by the use of ultrasonic energy even when tabs are brought through sealing layer.

Ultrasonic energy was used to demonstrate the sealing of another embodiment of the present invention. Copper and aluminum both were investigated as barrier layers as per example 2. It was found that bismuth is an excellent metal for use as a barrier layer for its low melting temperature, ductility and moisture resistance. Parylene-Bi-Parylene packages were fabricated as per the details of example 4. The packages were sealed using ultrasonic energy. The use of ultrasonic energy allowed the sealing of high temperature polymers without the use of high temperatures that could damage the battery contained within. The results show that for a single layer metallization, ultrasonic energy can be effective in sealing two layers of parylene together.

The existence of pinholes in metallization of <10 microns thickness is very well known. To circumvent this challenge, multiple layer metallization was used as per the details of example 5. The as-formed parylene-bismuth-parylene-bismuth-parylene packaging had no observed through holes. The non hermetic nature afforded by the pinholes can be circumvented by depositing multiple layers, creating a longer path length for diffusion. As can be seen in example 5, this methodology was effective to demonstrate an ultrasonically sealed package with no linear carbonate solvent loss after extended time at 40° C. This test effectively demonstrates the excellent performance of the multilayer parylene package, the seal layer and the use of ultrasonic energy to seal a cell.

Although parylene as a barrier material is highly effective to improving the barrier properties of battery package seal, true hermeticity can only be afforded by the use of inorganic materials. In thick metal cylindrical and prismatic cans, edges can be sealed through the use of laser welding which results in a continuous metallic barrier. In many situations, it is highly advantageous to use thinner more flexible multilaminate packaging. The thinness saves volume thereby improving energy density, and the material can be formed into shapes on an as needed bases. Although the barrier properties of the face of the material are excellent due to the use of 20-40 micron thick metals, the seals suffer as they rely on the use of modified polyolefins as the sealing material. Although parylene is much more effective, it is not truly hermetic. Due to the poor sealing properties of the seals, the width of the seal needs to remain large to afford a long diffusion distance. This severely impedes the ability to shorten the width of the seal and improve the volumetric energy density of the power source.

According to another aspect, an approach has been developed where the seal to seal bond is metal and affords a hermetic encapsulation throughout the entire battery edge except for where the conductive tabs exit the cell. The latter is not so much of a problem as this section of the seal is typically <5% of the entire seal area.

This invention is realized by a packaging where the seal is comprised of metal as opposed to a polymer. Furthermore, the metal utilized for the seal can have a melting temperature below that of the polymer utilized in the packaging. For example, the package comprises multiple layers of metal and polymer that affords a package with excellent barrier and mechanical properties. The layers can be of the dimensions 1-100 microns thick. For example, the layers can be 1-20 microns thick. One of the layers is a metal or metal composition that has a melting temperature lower than the polymer layers and other metal layers if used. This metal barrier can be fully exposed on the inside face of the package or, in some examples, only at the seal edge of the package. In the latter case, most of the inner face will be a polymer such that the electrochemical cell will not be in electrical contact with the packaging. After an electrochemical cell is placed into the packaging, the two metal layers then can be sealed together using thermal (resistive heat or laser) or ultrasonic energy. Table 1 lists examples of possible combinations for the metal layer and the polymer; all metals shown below the listing of a given polymer can be utilized in conjunction with that polymer.

Table 1: Examples of metals that can be used for hermetic seals related to the present invention. Any metal below the temperature of the indicated polymer can be utilized.
Composition $T_m$° C. or Range for Non Eutectic
$Au_{82}In_{18}$ 451/485
    PARYLENE N $T_m$=420° C.
       PARYLENE D $T_m$=380° C.
$Au_{98}Si_2$ 370/800
$Au_{87.5}Ge_{12.5}$ 361/356
$Cd_{95}Ag_5$ 340/395
$Cd_{95}Ag_5$ 338/393
$Pb_{98}Sn_2$ 316/322
$Pb_{97}Sn_3$ 314/320
$Pb_{95}Sn_5$ 308/312
$Pb_{94.5}Ag_{5.5}$ 305/364
$Pb_{95}Ag_5$ 305/364
$Pb_{92.5}In_5Ag_{2.5}$ 300/310
$Pb_{92.5}In_5Au_{2.5}$ 300/310
$Pb_{96}Sn_4$ 299/310
$Pb_{95.5}Sn_2Ag_{2.5}$ 299/304
$Pb_{93.5}Sn_5Ag_{1.5}$ 296/301
    PARYLENE C $T_m$=290° C.
$Pb_{90}In_5Ag_5$ 290/310
$Pb_{93}Sn_7$ 288/308
$Pb_{92.5}Sn_5Ag_{2.5}$ 287/296
$Pb_{92}Sn_{5.5}Ag_{2.5}$ 286/301
    POLYURETHANE $T_m$=284° C.
Bi 271.5
$Pb_{81}In_{19}$ 270/280
$Pb_{90}Sn_{10}$ 268/302
$Pb_{88}Sn_{10}Ag_2$ 268/290
    POLYESTER $T_m$=265° C.
$Pb_{88}Sn_{12}$ 254/296
$Pb_{96}Sn_2Ag_2$ 252/295
$Pb_{80}Sn_{18}Ag_2$ 252/260
$Pb_{75}In_{25}$ 250/264
$Pb_{70}In_{30}$ 245/260
$Sn_{95}Sb_5$ 235/240
$Sn_{97}Sb_3$ 232/238
$Sn_{99}Sb_1$ 232/235
$Sn_{97}Cu_{2.75}Ag_{0.25}$ 228/314
$Pb_{85}Sn_{15}$ 227/288
$Sn_{97}Cu_3$ 227/250
$Sn_{96}Ag_4$ 221/229
$Sn_{95}Ag_5$ 221/240
$Sn_{96.2}Ag_{2.5}Cu_{0.8}Sb_{0.5}$ 217/225
$Sn_{95.8}Ag_{3.5}Cu_{0.7}$ 217/218
$Sn_{99}Cu_{0.7}Ag_{0.3}$ 217/228
$Sn_{96.5}Ag_3Cu_{0.5}$ 217/220
$Sn_{91.8}Bi_{4.5}Ag_{3.4}$ 211/213
$Sn_{86.9}In_{10}Ag_{3.1}$ 204/205
$Zn_{70}Sn_{30}$ 199/376
$Sn_{70}Zn_{30}$ 199/311
$Sn_{88}In_8Ag_{3.5}Bi_{0.5}$ 197/208
$Pb_{60}In_{40}$ 195/225
$Sn_{89}Zn_8Bi_3$ 191/198
$Pb_{67}Sn_{33}$ 187/230
$Pb_{70}Sn_{30}$ 185/255
$Pb_{68}Sn_{30}Sb_2$ 185/243
$Pb_{63}Sn_{35}Sb_2$ 185/243
$Pb_{79}Sn_{20}Sb_1$ 184/270
$Pb_{50}Sn_{20}$ 183/280
$Pb_{75}Sn_{25}$ 183/266
$Pb_{65}Sn_{35}$ 183/250
$Pb_{60}Sn_{40}$ 183/238
$Pb_{55}Sn_{45}$ 183/227
$Sn_{50}Pb_{50}$ 183/216
$Sn_{50}Pb_{49}Cu_1$ 183/215
$Sn_{50}Pb_{48.5}Cu_{1.5}$ 183/215
$Sn_{90}Pb_{10}$ 183/213
$Sn_{70}Pb_{30}$ 183/193
$Sn_{60}Pb_{40}$ 183/190
$Sn_{60}Pb_{38}Cu_2$ 183/190
$Sn_{83.6}Zn_{7.6}In_{8.8}$ 181/187
$In_{50}Pb_{50}$ 180/209
$Pb_{54}Sn_{45}Ag_1$ 177/210
    PvDF $T_m$=177° C.
$Sn_{77.2}In_{20}Ag_{2.8}$ 175/187
$Sn_{86.5}Zn_{5.5}In_{4.5}Bi_{3.5}$ 174/186
$In_{60}Pb_{40}$ 174/185
$Pb_{63}Sn_{34}Zn_3$ 170/256
$In_{70}Pb_{30}$ 160/174
$In_{75}Pb_{25}$ 156/165
$Sn_{43}Pb_{43}Bi_{14}$ 144/163
$In_{90}Ag_{10}$ 143/237
$In_{80}Pb_{15}Ag_5$ 142/149
$Sn_{48}Bi_{32}Pb_{20}$ 140/160
$Cd_{70}Sn_{30}$ 140/160
$Bi_{57}Sn_{42}Ag_1$ 137/139
$Sn_{37.5}Pb_{37.5}In_{25}$ 134/181
$Sn_{37.5}Pb_{37.5}In_{26}$ 134/181
    Polypropylene $T_m$=130° C.-171° C.
$Sn_{54}Pb_{26}In_{20}$ 130/154
$Bi_{58}Pb_{42}$ 124/126
    Polyethylene $T_m$=120° C.-130° C.
$Sn_{46}Pb_{46}Bi_8$ 120/167
$Sn_{58}In_{42}$ 118/145
$Sn_{52}In_{48}$ 118/131
$In_{50}Sn_{50}$ 118/125
$In_{60}Sn_{40}$ 113/122
$Bi_{46}Sn_{34}Pb_{20}$ 100/105
$Zn_{95}Sn_5$ 382
$Au_{96.8}Si_{3.2}$ 370
$Pb_{92}Cd_8$ 310
$Pb_{97.5}Ag_{1.5}Sn_1$ 309
$Sn_{97.5}Pb_1Ag_{1.5}$ 305

$Pb_{96}Ag_4$ 305
$Pb_{97.5}Ag_{2.5}$ 303
$Pb_{90}Sn_5Ag_5$ 292
$Au_{80}Sn_{20}$ 280
$Cd_{82.5}Zn_{17.5}$ 265
$Pb_{68}Sn_{32}$ 253
$Sn_{95}Pb_5$ 238
$Sn_{65}Ag_{25}Sb_{10}$ 233
Sn 232
$Sn_{99.3}Cu_{0.7}$ 227
$Sn_{96.5}Ag_{3.5}$ 221
$Sn_{95}Ag_{3.5}Zn_1Cu_{0.5}$ 221
$Sn_{95.6}Ag_{3.5}Cu_{0.9}$ 217
$Sn_{95.5}Ag_{3.8}Cu_{0.7}$ 217
$Sn_{95.5}Ag_{3.9}Cu_{0.6}$ 217
$Sn_{95.5}Ag_4Cu_{0.5}$ 217
$Sn_{90}Au_{10}$ 217
$Sn_{91}Zn_9$ 199
$Sn_{62}Pb_{38}$ 183
$Sn_{63}Pb_{37}P_{0.0015}$ 183
$Sn_{62}Pb_{37}Cu_1$ 183
$Sn_{63}Pb_{37}$ 182
$Sn_{62}Pb_{36}Ag_2$ 179
$Sn_{62.5}Pb_{36}Ag_{2.5}$ 179
$Sn_{70}Pb_{18}In_{12}$ 162
In 157
$Sn_{51.2}Pb_{30.6}Cd_{18.2}$ 145
$Sn_{50}Pb_{32}Cd_{18}$ 145
$Sn_{40}Pb_{42}Cd_{18}$ 145
$In_{97}Ag_3$ 143
$Bi_{58}Sn_{42}$ 138
$In_{70}Sn_{15}Pb_{9.6}Cd_{5.4}$ 125
$In_{74}Cd_{26}$ 123
$In_{52}Sn_{48}$ 118
$Bi_{50}Pb_{28}Sn_{22}$ 109
$Bi_{50}Pb_{31.2}Sn_{18.8}$ 97
$Bi_{52}Pb_{32}Sn_{16}$ 96
$Bi_{50}Pb_{25}Sn_{12.5}Cd_{12.5}$ 71
$Bi_{49.5}Pb_{27.3}Sn_{13.1}Cd_{10.1}$ 70.9
$Bi_{50.5}Pb_{27.8}Sn_{12.4}Cd_{9.3}$ 70/73
$In_{61.7}Bi_{30.8}Cd_{7.5}$ 62
$Bi_{48}Pb_{25.4}Sn_{12.8}Cd_{90.6}In_4$ 61/65
$In_{51.0}Bi_{32.5}Sn_{16.5}$ 60.5
$Bi_{49}Pb_{18}Sn_{15}In_{18}$ 58/69
$Bi_{47.5}Pb_{25.4}Sn_{12.6}Cd_{90.5}In_5$ 57/65
$Bi_{44.7}Pb_{22.6}In_{19.1}Cd_{5.3}Sn_{8.3}$ 47

In addition, polyvinylidene fluoride (PVDF), a high molecular weight, pure thermoplastic fluoropolymer that maintains superior abrasion resistance, chemical properties and mechanical strength over a temperature range of −40° F. to 250° F., can be used as the polymer material in the packaging.

There are a number of combinations that can be envisioned but it most cases it is desirable to have a higher temperature system that can still be practically sealed without damage to the electrochemical cell. Specific examples of this approach are given in example 6 and example 7. In these examples, the use of a thin Bi metallic layer in a single or multiple layer format to afford near hermeticity to the battery is demonstrated. Two exposed metal areas can then be thermally or ultrasonically sealed such that the hermetic inorganic layer forms a continuous or near continuous layer surrounding the battery. This is in sharp contrast to the state of the art technology which requires that flexible packaging be sealed along areas of polymer to polymer contact. This area is not hermetic and allows rapid diffusion of solvents and moisture through this seal.

Methodology for the fabrication of such packaging and metal layers includes but is not limited to thermal deposition, electron beam deposition, spray deposition, CVD, lamination technologies, and electrodeposition. The latter can be electrodeposited or electroless deposited.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the described invention, the preferred methods and materials are now described. All publications mentioned herein are incorporated herein by reference to disclose and describe the methods and/or materials in connection with the publications are cited.

It must also be noted that as used herein and in the appended claims, the singular forms "a," "and" and "the" include plural referents unless the context clearly dictates otherwise. All technical and scientific terms used herein have the same meaning.

The publications discussed herein are provided solely for their disclosure prior to the filing date of the present application. Nothing herein is to be construed as an admission that the described invention is not entitled to antedate such publication by virtue of prior invention. Further, the dates of publication provided may be different from the actual publication dates which may need to be independently confirmed.

It should be understood by those skilled in the art that various changes may be made and equivalents may be substituted without departing from the true spirit and scope of the Invention. In addition, many modifications may be made to adapt a particular situation, material, composition of matter, process, process step or steps, to the objective, spirit and scope of the described invention. All such modifications are intended to be within the scope of the claims appended hereto.

The following examples are provided to further illustrate various non-limiting embodiments and techniques. It should be understood, however, that these examples are meant to be illustrative and do not limit the scope of the claims. As would be apparent to one of skill in the art, many variations and modifications are intended to be encompassed within the spirit and scope of the invention. All references and patents cited in this application are incorporated by reference in their entirety.

EXAMPLES

The following examples are put forth so as to provide those of ordinary skill in the art with a complete disclosure and description of how to make and use the described invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1: A Pure Parylene Package Compared with Pure Polypropylene and Polyethylene Based Package About 18 g of Parylene Dimer DPX-C was placed in Parylene Deposition System PDS2010 Labcoater™ 2 to produce ~20 μm thick Parylene sheets. 1"×1.5" pieces were cut out from the parylene sheets, polyethylene (acid modified polyethylene under the trade name Surlyn®) and acid modified polypropylene material to prepare packages. Using a heat sealer, each side of the parylene pieces was sealed about 3 mm wide using 270° C. temperature and 30-40 PSI pressure with a 5 sec interval. For polypropylene, temperature used was 200-190° C., 30-40 PSI with a 5 sec interval; for polyethylene pieces temperature required was 160° C. with the same and pressure and time interval as the previous materials. Each package was weighed out before it was filled with 25 μL of DMC and $H_2O$ and then it was weighed again and placed in a 40° C. oven. Weights were taken every hour for a whole day, and then once a day for several days. As can be seen in FIG. 1 the $H_2O$ loss was similar for all packaging, but the linear carbonate loss was significantly less for the parylene sealed under various conditions relative to the pure polypropylene and polyethylene materials.

Example 2: A Parylene/Copper Sealed Package Using Thermal Energy

Figure 3:
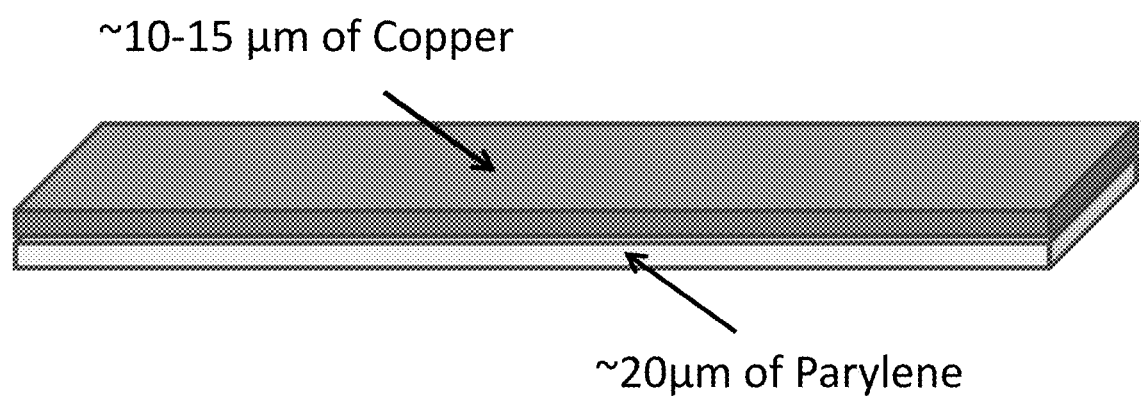
FIG. 3 is a schematic showing deposition of a copper layer on top of the parylene layer.
Figure 4:
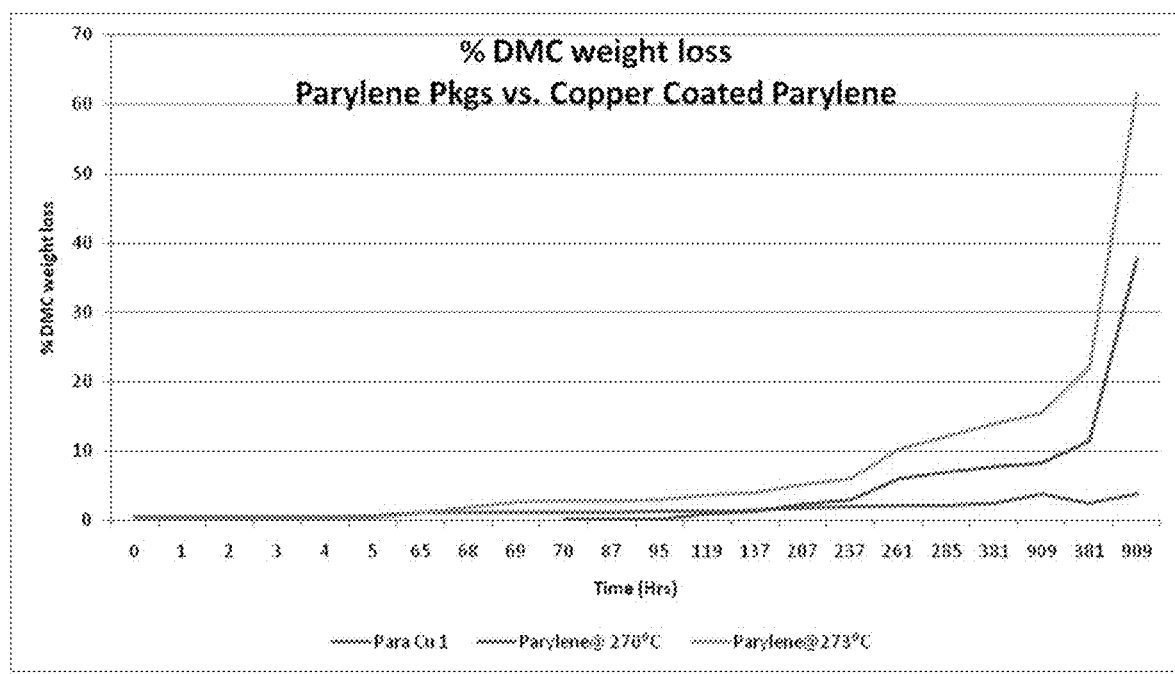
FIG. 4 shows the percent loss of DMC as a percentage for parylene packages compared to copper coated parylene (para Cu 1).

About 18 g of Parylene Dimer DPX-C was placed in Parylene Deposition System PDS2010 Labcoater™ 2 to produce ~20 μm thick Parylene sheets. Then, 4.75"×4.75" pieces were cut out and submerged in A174 solution, which is a tradename for an adhesion coating based on 3-Methacryloxypropyltrimethoxysilane for adhesion characteristics. After drying, the pieces were transported to a thermal evaporation chamber. Deposition was done with the use of a PVD Thermal Evaporation unit, and about 12 Copper ⅛"×⅛" pieces as a source to obtain an 10-15 μm thick Copper layer (FIG. 3). After the deposition was performed, a few 1"×1.5" pieces were cut out from the Cu coated parylene sheets. Using a heat sealer, each side of the cut out pieces was sealed about 3 mm wide at 292° C. temperature and 30-40 PSI pressure with a 7 sec interval. Each package was weighed out before it was filled with ~20 μL of DMC, then it was weighed again and placed in a 40° C. oven. Weights were taken every hour for 5 hours, and then once a day for several days. As can be seen from FIG. 4, a very significant decrease in loss of linear solvent occurred for the metalized barrier relative to the pure parylene.

Example 3: Method to Ultrasonically Seal a Multilaminate Packaging with Tabs

Packages comprising 1.5"×1.5" square multilaminate (Dai Nippon D-EL 40) polypropylene (PP) seal pouches containing a 1" square Li-ion battery bicell with copper and aluminum tabs. The 0.001" copper tabs are first cleaned with acetone, while the 0.002" aluminum tabs are etched in 9.5M NaOH (aq) for two minutes. An impulse sealer set at 260° C. and 70 psi for 5 s seals with a polypropylene based adhesive sealed onto the tabs, once on each side, with a 25 μm parylene layer protective sleeve was used. The following conditions transpired for each pouch variation as exemplified in figure above:
A) The four sides of the PP packages are ultrasonically welded together at: 45% amplitude, system pressure of 15 psi, trigger force of 16, and 50 J of energy
B) PP packages are ultrasonically welded onto the adhesive-tacked tabs with a trigger force of 14 psi, and 56 J of energy. The system pressure and amplitude remained the same. The amount of energy used for the side and final ultrasonic welds varied from 70 J and 60 J, respectively.

Pre-weighed samples were activated with 1M $LiPF_6$ EC:DMC. Samples underwent testing for the safe packaging and shipment of lithium metal and lithium ion batteries (Department of Transportation (DOT) testing) lasting approximately 14 hour cycles from 75° C. to −40° C. with 6 hours at each temperature. Electrolyte loss was measured and percent total loss was normalized to the weight of a full cell.

Figure 5:
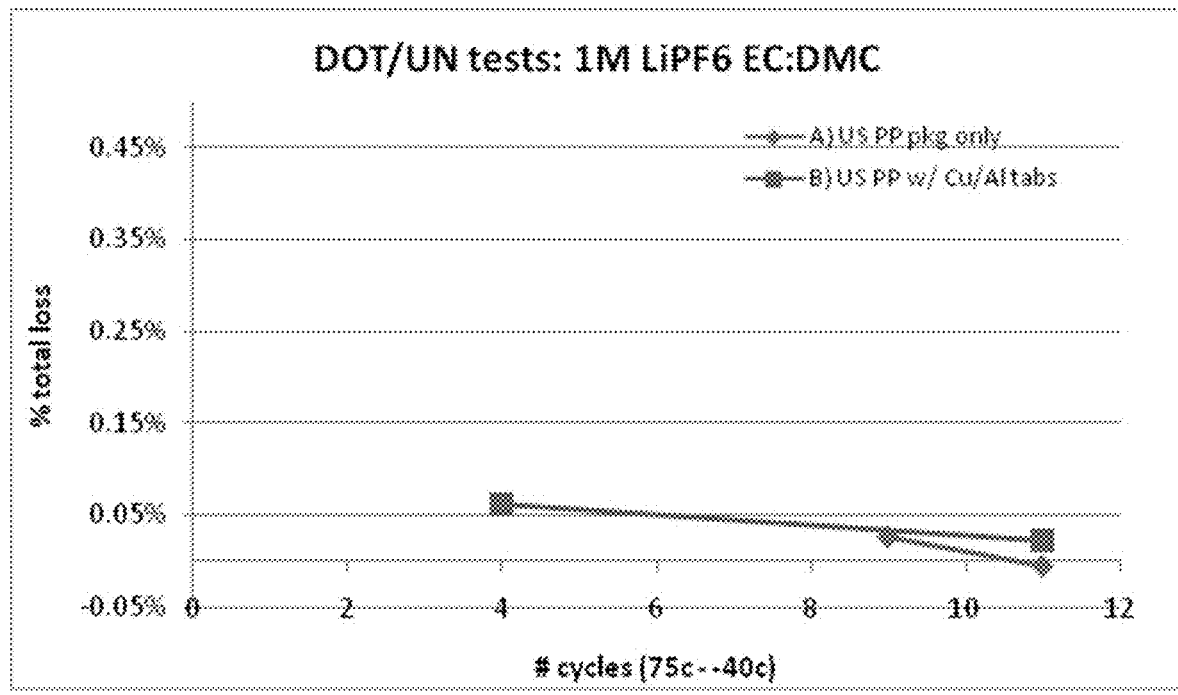
FIG. 5 shows the results of Department of Transportation (DOT)-type tests measuring electrolyte loss of electrochemical cells in an ultrasonically sealed multilaminate of nylon-Al-polypropylene (US PP) packaging and US PP with Cu/Al tabs. Samples were activated with standard 1M $LiPF_6$ EC:DMC.

As shown in FIG. 5 above, the packages can withstand a simulation with 0.2% total loss after 11 cycles, meeting DOT specifications and proving the viability of ultrasonic sealing for batteries.

Figure 6:
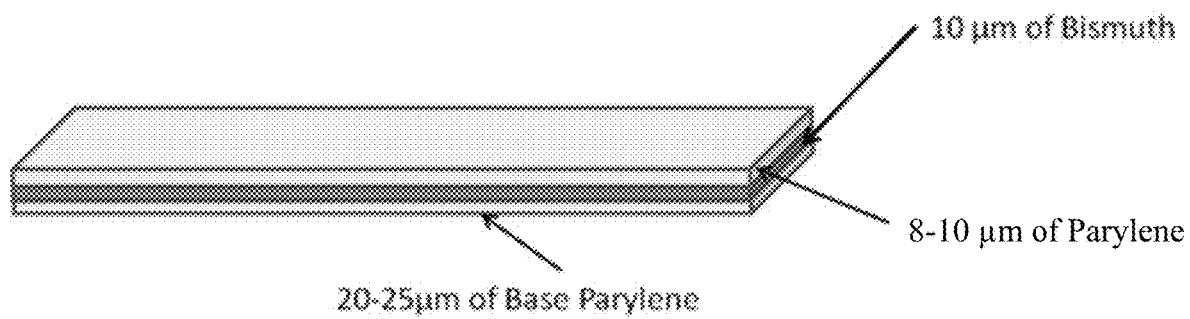
FIG. 6 is a schematic showing base parylene, layered with bismuth, topped off with parylene.

Example 4: A Single Inorganic (Bismuth) Layer Parylene Composite Package Using Ultrasonic Energy Approximately 21 g of Parylene Dimer DPX-C was placed in a Parylene Deposition System PDS2010 Labcoater™ 2 to produce ~25 μm thick Parylene sheets. Then, 4.75"×4.75" pieces were cut out and submerged in A174 solution which is a tradename for an adhesion coating based on 3-Methacryloxypropyltrimethoxysilane for adhesion characteristics. After drying, the pieces were transported to thermal evaporation chamber. Deposition was done with the use of a PVD Thermal Evaporation unit. Bismuth pieces were placed in a Tungsten boat as a source to obtain a 20 μm thick Bi layer. The Bismuth layer was topped off with 8-10 μm layer of parylene, totaling 45 μm of material (FIG. 6).

Bonding of the package's parylene-C layer is carried out using a Branson 2000X ultrasonic plastic welder with a custom anvil and horn. Packages consist of 1.125" diameter circles punched out of the double layer composite material. The base 20-25 μm layers of each half lay facing each other on the anvil. The sealing area of the horn measures approximately 0.0393" in thickness.

Figure 7:
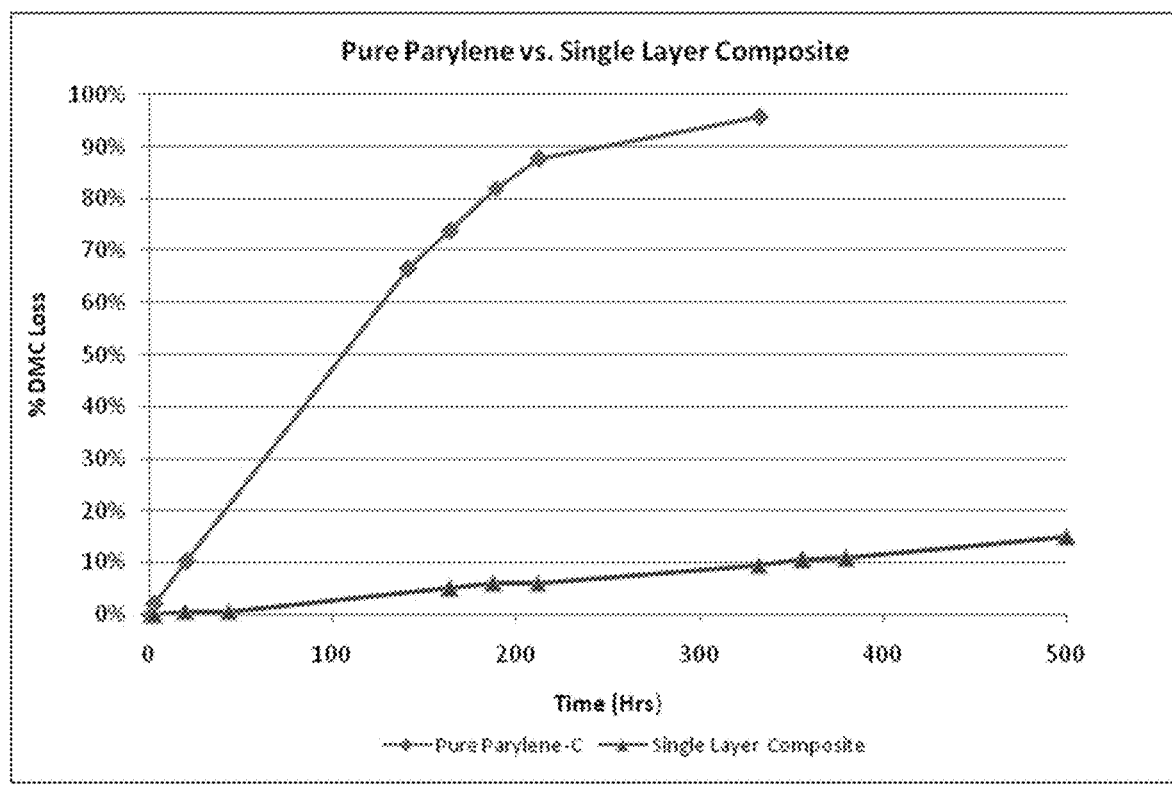
FIG. 7 shows the loss of DMC as a percentage in the single layer composite package versus percentage loss in the pure parylene package at 40° C. over time.

The equipment operated at 20 kHz with a system pressure set at 30 psi and a 25 lb weld trigger force. The amplitude of the wave is set at 85% of the maximum 90 microns. Welds are executed in "energy mode" with a setting of 150 joules. Single layer packages are hit once with these settings to induce bonding. 150 μl of dimethyl carbonate (DMC) fill the packages, which are then closed using an impulse sealer set at 275° C. for 10 seconds. FIG. 7 shows the loss of DMC as a percentage in the single layer composite package versus percentage loss in the pure parylene package. The packages stay in a 40° C. environment with weight measurements taken periodically. The data shows the exceptional ability of the ultrasonically sealed parylene bismuth composite to act as a barrier material.

Figure 8:
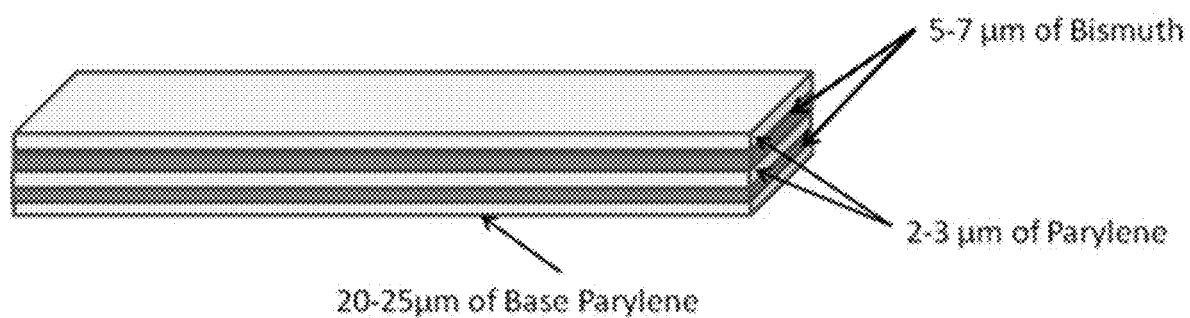
FIG. 8 is a schematic showing a double inorganic (bismuth) layer parylene composite package.

Example 5: A Double Inorganic (Bismuth) Layer Parylene Composite Package Using Ultrasonic Energy Approximately 20 g of Parylene Dimer DPX-C was placed in a Parylene Deposition System PDS2010 Labcoater™ 2 to produce ~22 μm thick Parylene sheets. Then, 4.75"×4.75" pieces were cut out and submerged in A174 solution for adhesion characteristics. After drying, the pieces were transported to a thermal evaporation chamber. Deposition was done with the use of a PVD Thermal Evaporation unit. Bismuth pieces were placed in a Tungsten boat as a source to obtain an approximately 5-9 μm thick Bi layer. Then, the sheets were transported to the PDS2010 Laboratory coater. Another 2-3 μm layer of parylene was placed, and again, transported to the thermal deposition unit for another 5-7 µm layer of Bismuth. The second Bismuth layer was topped off with 2-3 µm layer of parylene, totaling 50 µm of material (FIG. 8).

Bonding of the package's parylene-C layer is carried out using a Branson 2000X plastic welder with a custom anvil and horn. Packages consist of 1.125" diameter circles punched out of the double layer composite material. The base 20-25 µm layers of each half lay facing each other on the anvil. The sealing area of the horn measures approximately 1 mm in thickness.

Figure 9:
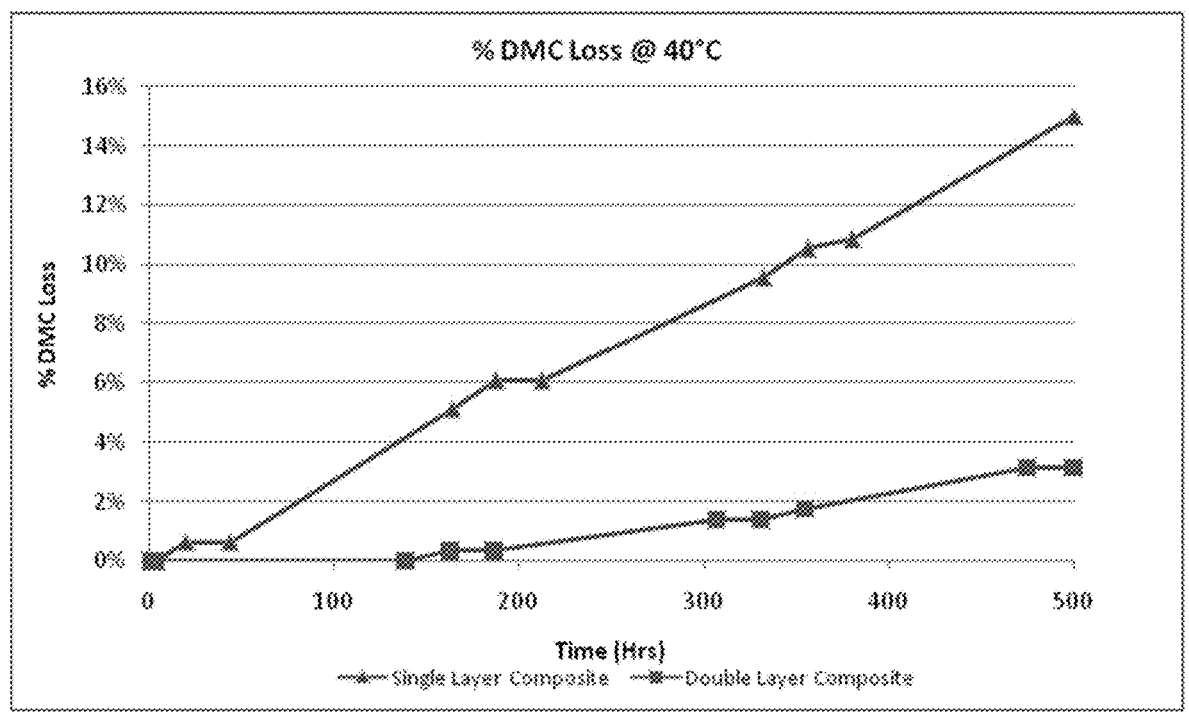
FIG. 9 shows the loss of DMC as a percentage in the double layer composite package versus percentage loss in the single layer composite package at 40° C. over time.
Figure 10:
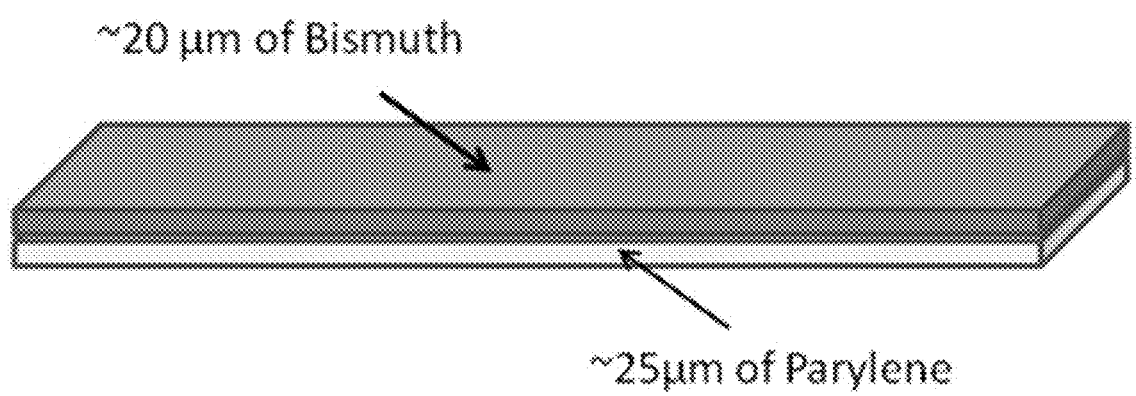
FIG. 10 is a schematic of a bismuth-coated parylene package.
Figure 11:
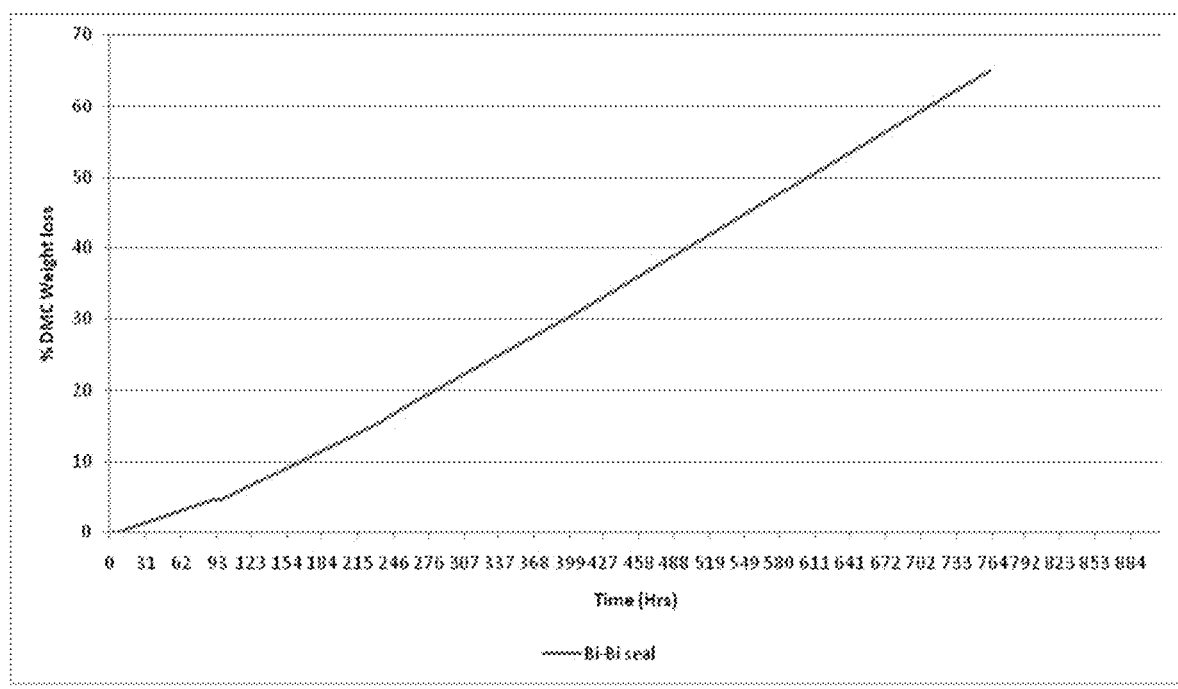
FIG. 11 shows loss of DMC as a percentage in a package containing a double layer of inorganic material package and a double layer of parylene (from top to bottom, bismuth-parylene-bismuth-parylene).
Figure 12:
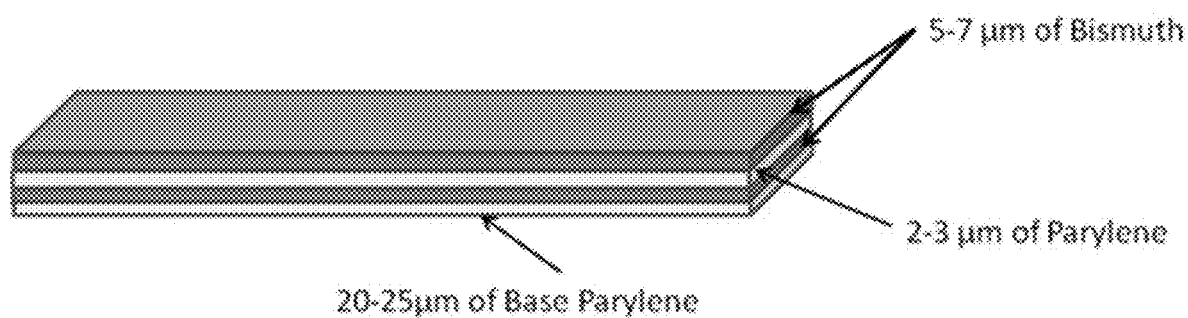
FIG. 12 is a schematic of one layer of packaging material consisting of a double layer of inorganic material package and a double layer of parylene (from top to bottom, bismuth-parylene-bismuth-parylene).

The equipment operated at 20 kHz with a system pressure set at 30 psi and a 30 lb weld trigger force. The amplitude of the wave is set at 82% of the maximum 90 microns. Welds execute in "energy mode" with a setting of 175 joules. Double layer packages are hit twice consecutively with these settings to induce bonding. 150 µl of dimethyl carbonate (DMC) fill the packages, which are then closed using an impulse sealer set at 275° C. for 10 seconds. FIG. 9 shows the loss of DMC as a percentage in the double layer composite package versus percentage loss in the single layer composite package. The packages stay in a 40° C. environment with weight measurements taken periodically and show the outstanding capability of the material to maintain solvent relative to a single layer composite.

Example 6: A Hermetic Bonded Packaging Using a Single Layer of Inorganic Material Approximately 24 g of Parylene Dimer DPX-C was placed in a Parylene Deposition System PDS2010 Labcoater™ 2 to produce ~25-30 µm thick Parylene sheets. Then, 4.75"×4.75" pieces were cut out and submerged in A174 solution for adhesion characteristics. After drying, the pieces were transported to a thermal evaporation chamber. Deposition was performed with the use of a PVD Thermal Evaporation unit. Bismuth pieces were placed in a Tungsten boat as a source to obtain an approximately 20 µm thick Bi layer. After the deposition was performed, a few 1"×1.5" pieces were cut out from the Bi coated parylene sheets. Using an Impulse sealer, each side (Bi—Bi) of the cut out pieces was sealed about 3 mm wide using 268° C. temperature and 74-75 PSI pressure with a 30 sec interval. Each package was weighed out before it was filled with ~20 µL of DMC; then it was weighed again and placed in an 40° C. oven. Weights were taken every hour for 5 hours, and then once a day for several days.

Example 7: A Hermetic Bonded Package Using a Double Layer of Inorganic Material 20 g of Parylene Dimer DPX-C was placed in a Parylene Deposition System PDS2010 Labcoater™ 2 to produce ~25-30 µm thick Parylene sheets. Then, 4.75"×3.0" pieces were cut out and submerged in A174 solution for adhesion characteristics. After drying, the pieces were transported to a thermal evaporation chamber. Deposition was performed with the use of a PVD Thermal Evaporation unit. Bismuth pieces were placed in a Tungsten boat as a source to obtain an approximately 5-7 µm thick Bi layer. Then, the sheets were transported to the PDS2010 Laboratory coater. Another 2-3 µm layer of parylene was placed, and again, the sheets were transported to the thermal deposition unit for another 5-7 µm layer of Bismuth. After the deposition was performed, a few 1"×1.5" pieces were cut out from the Bi coated parylene sheets. Using an Impulse sealer, each side (Bi—Bi) of the cut out pieces was sealed about 3 mm wide using 268° C. temperature and 74-75 PSI pressure with a 30 sec interval. Each package was weighed out before it was filled with ~20 µL of DMC; then it was weighed again and placed in 40° C. oven. Weights were taken every hour for 5 hours, and then once a day for several days.

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto. All publications and patents cited in this specification are herein incorporated by reference in their entirety.

What is claimed is:
1. A method comprising:
   obtaining an electrochemical cell;
   forming a first sheet of packaging material;
   wherein the first sheet of packaging material comprises a first layer of para-xylylene polymer;
   forming a second sheet of packaging material;
   wherein the second sheet of packaging material comprises a second layer of para-xylylene polymer;
   bonding the first layer of para-xylylene polymer of the first sheet to the second layer of para-xylylene polymer of the second sheet using ultrasonic energy to form a bonded sheet;
   bonding the first layer of para-xylylene polymer to a third layer of first metal to form the first sheet of packaging material;
   bonding the second layer of para-xylylene polymer to a fourth layer of second metal to form the second sheet of packaging material;
   forming a free-standing package using the bonded sheet;
   encapsulating the electrochemical cell in the free-standing package;
   wherein the electrochemical cell comprises an anode, a cathode, and an electrolyte in contact with the anode and the cathode, wherein the first layer of para-xylylene polymer and the second layer of para-xylylene polymer are in contact with the electrolyte.

2. The method of claim 1, wherein the forming the free-standing package step and the encapsulating step are conducted concomitantly.

3. The method of claim 1, wherein at least one of the first metal and the second metal comprises at least one of aluminum, copper, bismuth, lead, tin, gallium, or indium.

4. The method of claim 3, further comprising bonding the third layer of the first metal and the fourth layer of the second metal to form a hermetic seal.

5. The method of claim 4, wherein the step of bonding the third layer of the first metal and the fourth layer of the second metal is conducted using at least one of thermal energy, ultrasonic energy, or laser energy.

6. The method of claim 1, wherein the electrochemical cell comprises current collecting tabs, wherein the current collecting tabs extend from an interior space of the free-standing package to an environment outside of the free-standing package between the first sheet of packaging material and the second sheet of packaging material.

7. The method of claim 1, wherein at least one of the first sheet of packaging material or the second sheet of packaging material comprises a plurality of alternating layers of para-xylylene polymer and metal.

8. A method comprising:
forming a first sheet of packaging material;
wherein the first sheet of packaging material comprises a first layer of para-xylylene polymer;
forming a second sheet of packaging material;
wherein the second sheet of packaging material comprises a second layer of para-xylylene polymer;
bonding the first layer of para-xylylene polymer of the first sheet to the second layer of para-xylylene polymer of the second sheet using ultrasonic energy to form a bonded sheet;
bonding the first layer of para-xylylene polymer to a third layer of first metal to form the first sheet of packaging material;
bonding the second layer of para-xylylene polymer to a fourth layer of second metal to form the second sheet of packaging material;
forming a free-standing package using the bonded sheet, wherein the free-standing package is configured to encapsulate an electrochemical cell comprising an anode, a cathode, and an electrolyte in contact with the anode and the cathode, wherein the first layer of para-xylylene polymer and the second layer of para-xylylene polymer are in contact with the electrolyte.

9. The method of claim 8, wherein at least one of the first metal and the second metal comprises at least one of aluminum, copper, bismuth, lead, tin, gallium, or indium.

10. The method of claim 9, further comprising bonding the third layer of the first metal and the fourth layer of the second metal to form a hermetic seal.

11. The method of claim 10, wherein the step of bonding the third layer of the first metal and the fourth layer of the second metal is conducted using at least one of thermal energy, ultrasonic energy, or laser energy.

12. The method of claim 8, wherein at least one of the first sheet of packaging material or the second sheet of packaging material comprises a plurality of alternating layers of para-xylylene polymer and metal.

* * * * *